US010635325B2

(12) United States Patent
Sudan et al.

(10) Patent No.: US 10,635,325 B2
(45) Date of Patent: Apr. 28, 2020

(54) MANAGING PERSISTENT STORAGE WRITES IN ELECTRONIC SYSTEMS

(71) Applicant: ARM Limited, Cambridge (GB)

(72) Inventors: Kshitij Sudan, Austin, TX (US);
Stephan Diestelhorst, Cambridge (GB);
Michael Andrew Campbell, Waterbeach (GB)

(73) Assignee: ARM Limited, Cambridge (GB)

(*) Notice: Subject to any disclaimer, the term of this patent is extended or adjusted under 35 U.S.C. 154(b) by 164 days.

(21) Appl. No.: 15/358,885

(22) Filed: Nov. 22, 2016

(65) Prior Publication Data
US 2018/0143771 A1    May 24, 2018

(51) Int. Cl.
*G06F 3/06* (2006.01)
(52) U.S. Cl.
CPC ............ *G06F 3/0616* (2013.01); *G06F 3/064* (2013.01); *G06F 3/0659* (2013.01); *G06F 3/0679* (2013.01)
(58) Field of Classification Search
CPC .... G06F 3/0616; G06F 3/0653; G06F 3/0659; G06F 3/0673; G06F 12/10; G06F 2212/1036; G06F 2212/657
See application file for complete search history.

(56) References Cited

U.S. PATENT DOCUMENTS

| | | | | |
|---|---|---|---|---|
| 2004/0210418 A1* | 10/2004 | Fukuda | ............... | G06F 11/3442 702/182 |
| 2015/0052295 A1* | 2/2015 | Danilak | ............... | G06F 12/0246 711/103 |
| 2015/0106551 A1* | 4/2015 | Kim | ............... | G06F 12/0246 711/103 |
| 2015/0212745 A1* | 7/2015 | Li | ............... | G06F 12/0246 711/103 |
| 2015/0347296 A1* | 12/2015 | Kotte | ............... | G06F 12/0269 711/103 |
| 2016/0188455 A1* | 6/2016 | Patel | ............... | G06F 12/0246 711/154 |
| 2016/0210070 A1* | 7/2016 | Kurafuji | ............... | G06F 3/0622 |

* cited by examiner

*Primary Examiner* — Nanci N Wong
(74) *Attorney, Agent, or Firm* — Leveque IP Law, P.C.

(57) ABSTRACT

The apparatus operable to communicate with a memory comprises a persistent write tracker component operable to track frequency of persistent writes to at least one memory location during a time window; a threshold-exceeded detector component responsive to the tracker component and operable to detect excessive persistent writes to the at least one memory location during the time window; and a selective throttle component operable in response to a threshold-exceeded outcome from the detector component to cause selective throttling of persistent writes to the at least one memory location.

4 Claims, 3 Drawing Sheets

MANAGING PERSISTENT STORAGE WRITES IN ELECTRONIC SYSTEMS

FIELD OF THE DISCLOSURE

The presently disclosed technology relates to apparatus and methods for the management of persistent data in non-volatile memories (NVMs), such as solid state electronic memories.

BACKGROUND

Electronic memories and storage media of many descriptions may suffer from endurance limits, such that the lifetime of a particular memory location may be limited by the degree to which it has been used and reused. In particular, electronic NVMs suffer from endurance limits of individual memory bit-cells, whereby frequently writing to individual bit-cells degrades and eventually wears out the bit-cell, rendering it non-operational.

IN THE DRAWINGS

Implementations of the disclosed technology will now be described, by way of example only, with reference to the accompanying drawings, in which.

DETAILED DESCRIPTION

As described above, electronic memories and storage media of many descriptions may suffer from endurance limits, such that the lifetime of a particular memory location may be limited by the degree to which it has been used and reused. In particular, electronic NVMs suffer from endurance limits of individual memory bit-cells, whereby frequently writing to individual bit-cells degrades and eventually wears out the bit-cell, rendering it non-operational. Similar problems may arise in any of the types of memory in common use, whether on chip or on conventional non-volatile storage devices, such as disks.

With wider adoption of NVMs such as solid-state memories, modern instruction sets are starting to introduce programmer-controlled operations to provide abstractions that can ensure that data residing at a given address (and possibly cached at various levels in the memory hierarchy) has been committed or flushed all the way to the NVM. One example of such abstractions is the DCCVAP (Data Cache Clean, Virtual Address to Persist) instruction recently introduced in the ARM® instruction set architecture (ISA). Such instructions are targeted at ensuring that data deemed critical to be stored in a non-volatile manner is actually written to NVM and is thus available after a power-loss or restart of the system. Overuse of such instructions, whether in error or with malicious intent, may impact performance, reliability, availability and serviceability of individual apparatus and entire systems.

In a first approach, the described technology provides an apparatus, operable to communicate with a memory, and comprising a persistent write tracker component operable to track frequency of persistent writes to at least one memory location during a time window; a threshold-exceeded detector component responsive to the tracker component and operable to detect excessive persistent writes to the at least one memory location during the time window; and a selective throttle component operable in response to a threshold-exceeded outcome from the detector component to cause selective throttling of persistent writes to the at least one memory location.

Figure 1:
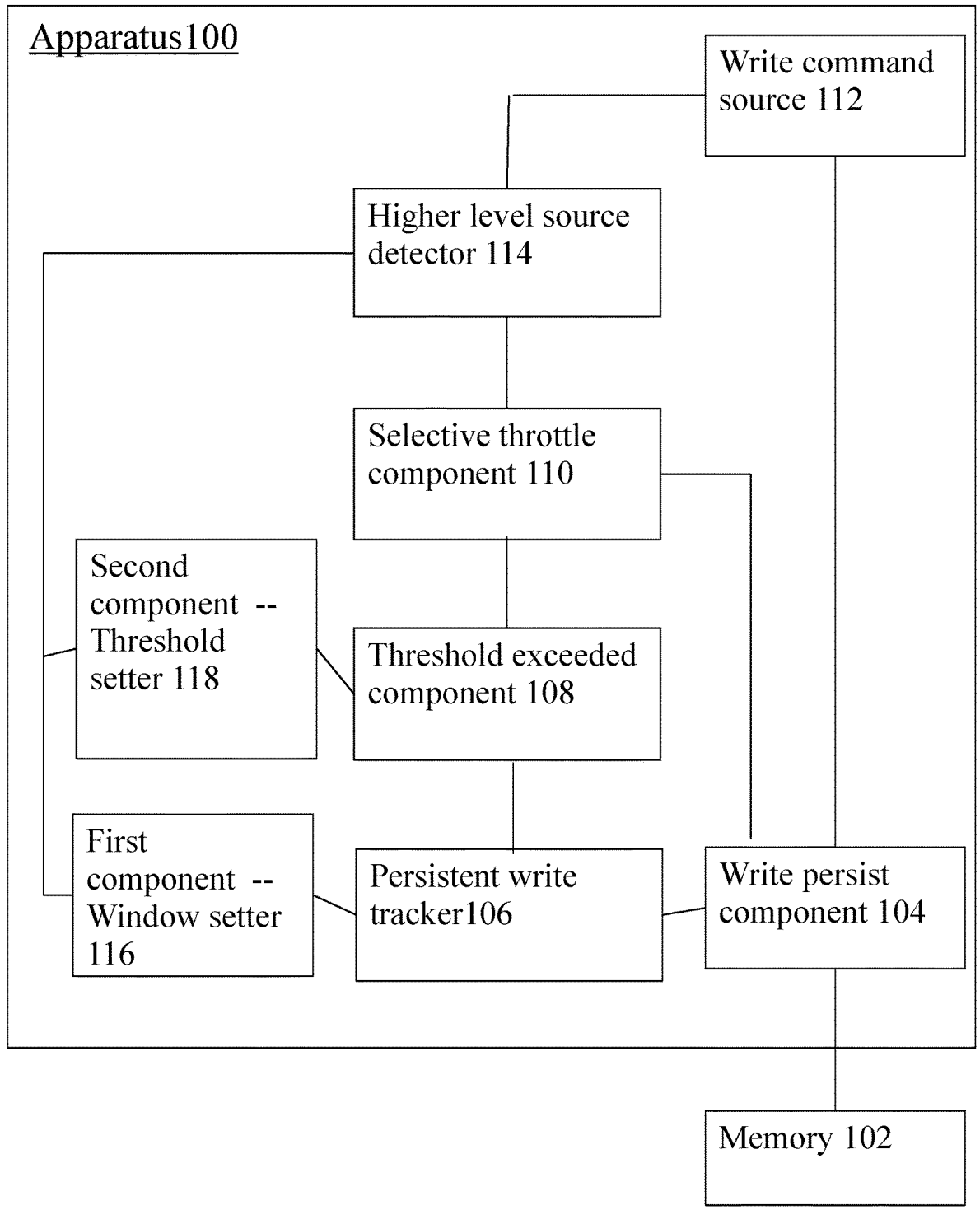
FIG. 1 shows an example of an apparatus operable according to the presently described technology.

In FIG. 1, there is shown an example of an apparatus 100 operable according to the presently described technology. Apparatus 100 is operatively coupled via an electronic connection to memory 102. Write persist component 104 is operable, responsive to commands from write command source 112, to perform persistent writes to memory 102, which may comprise solid state memory, conventional disk storage, or the like.

According to the present technology, persistent write tracker 106 is operable to track persistent writes to particular locations in memory 102 over predetermined time-windows. Threshold exceeded component 108 is operable to detect excessive persistent writes to particular locations in memory 102 over the aforementioned predetermined time-windows. Responsive to a positive detection of excessive persistent writes, selective throttle component 110 is operable to instruct write persist component 104 to throttle back persistent writes to the aforementioned particular locations in memory 102.

Selective throttle component 110 may further be operable to signal to higher level source detector 114 to trace a source of the write commands at a higher-level in the hardware/firmware/software stack, and to request higher level components to perform actions in response. Such actions may include, for example, disabling one or more write command sources 112, rate limiting one or more write command sources 112, or performing a remedial action on at least one source of persistent write commands. One example of such a remedial action is to redirect further persistent writes directed to the particular memory location in memory 102 to a further memory location in memory 102 or in a different memory or storage medium, while maintaining addressability to the data using, for example, virtualization techniques.

In one implementation, persistent write tracker 106 is cooperable with a first component 116 to adjust the time window in accordance with feedback from the at least one higher level in the hardware/firmware/software stack. The threshold exceeded component 108 may further be cooperable with a second component 118 to adjust the threshold in accordance with feedback from the at least one higher level in the hardware/firmware/software stack.

The present technology is thus operable to ameliorate degradation of memory bit-cells or other storage locations caused by the targeting of excessive writes to particular locations in the memory, whether caused by malicious actions or by erroneous or overzealous use of persist instructions by a programmer.

Figure 2:
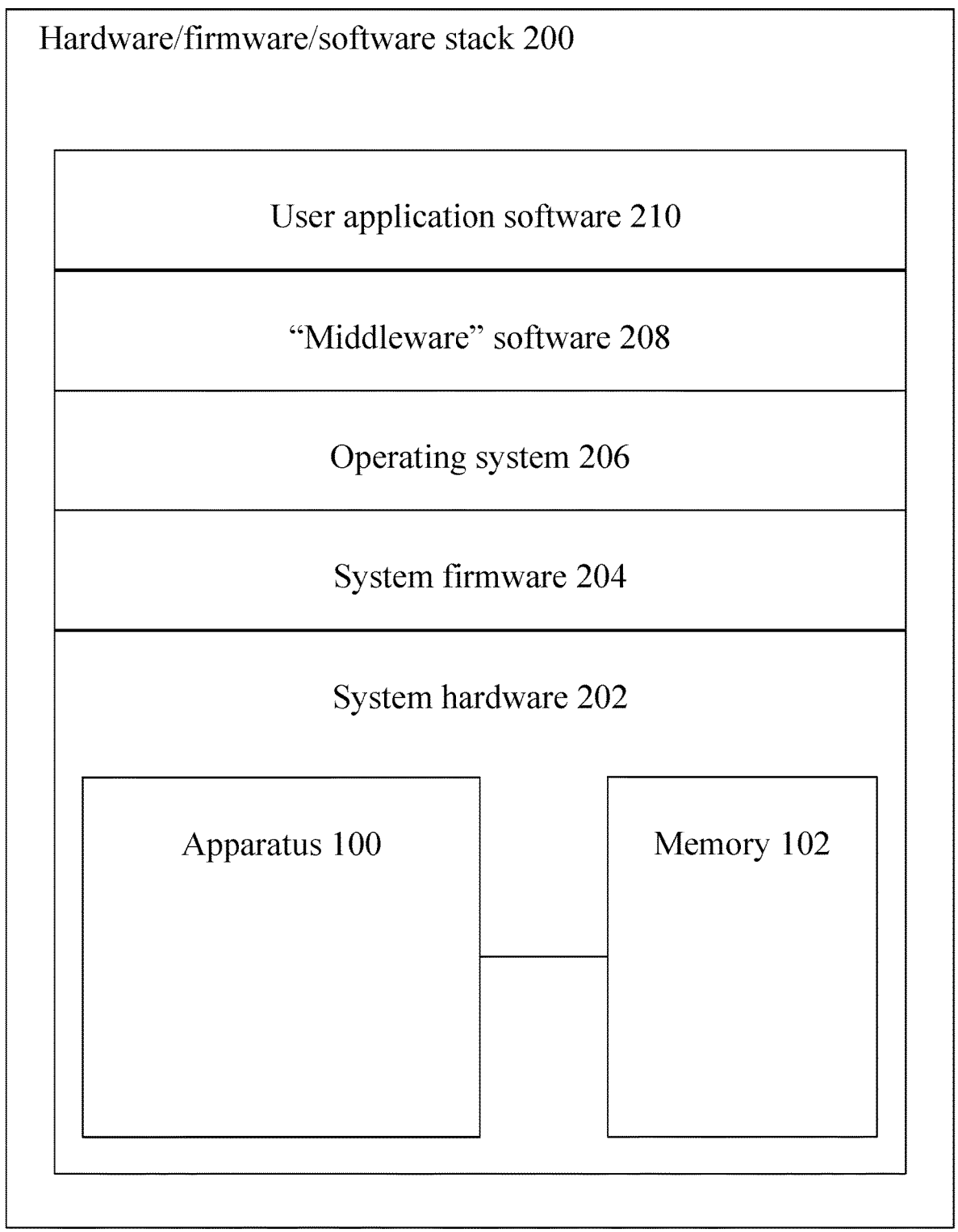
FIG. 2 shows an example of a hardware/firmware/software stack within which the present technology may be implemented.

In FIG. 2 is shown an example of a hardware/firmware/software stack 200 within which the present technology may be implemented. At the highest level is user application software 210, which may require services of "middleware" software 208, such as database environments or transaction processing environments. At a lower level is the operating system 206 (normally associated with the particular apparatus), which in turn relies upon system firmware 204 (such as the BIOS, for example). At the lowest level is the system hardware 202, which may comprise, for example, apparatus 100 and memory 102.

Figure 3:
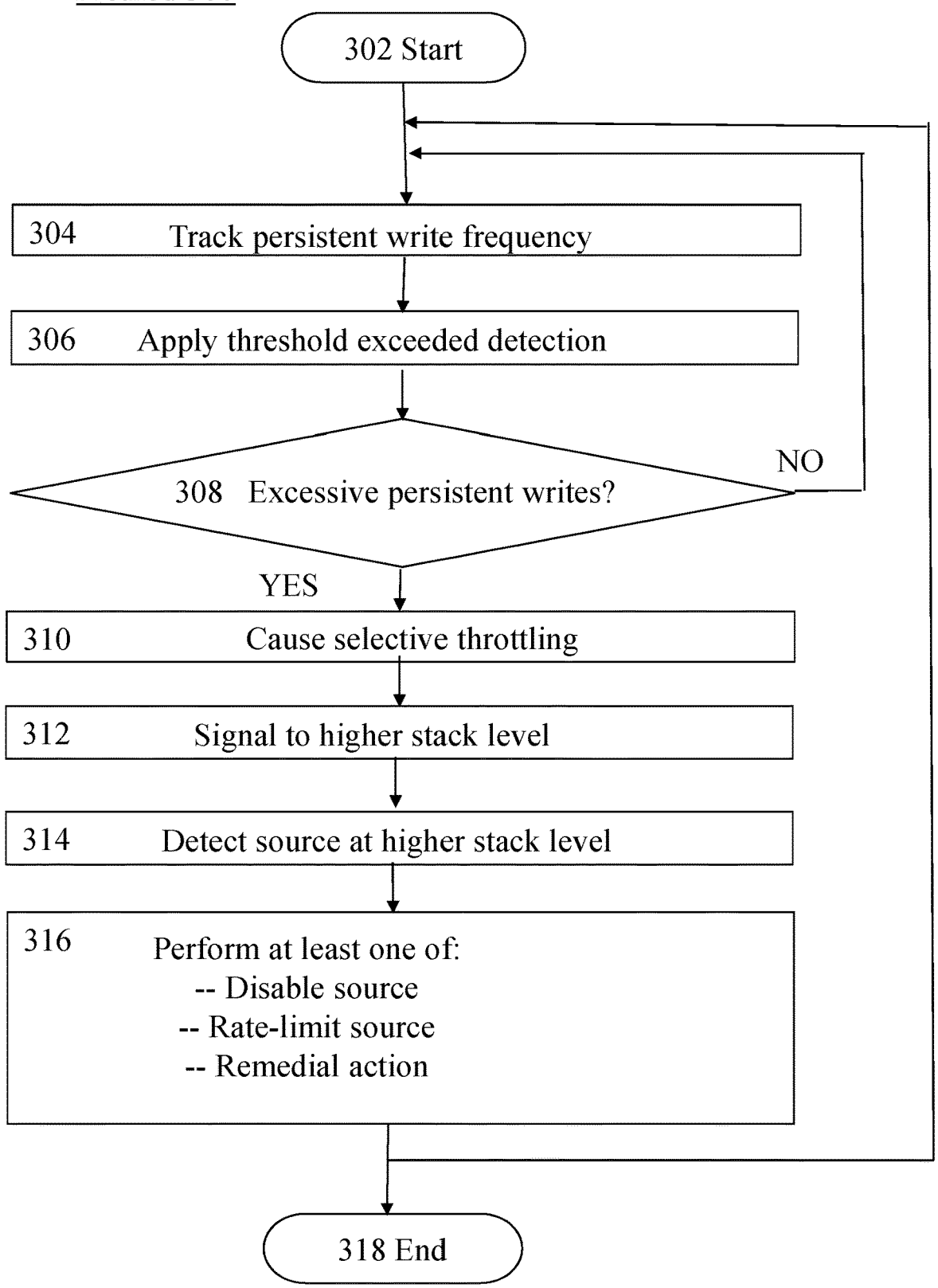
FIG. 3 shows an example of a method of operation of an electronic apparatus according to the presently described technology.

In FIG. 3 is shown an example of a method 300 of operation of an electronic apparatus according to the presently described technology. The method begins at Start step 302, and continues at step 304 to cause the apparatus to track the persistent write frequency across a time window. At step 306, threshold exceeded detection is applied to the results. If, at test step 308, no excessive numbers of persistent writes to a particular memory location are detected, the method loops back to step 304 and continues processing.

If, at test step 308, excessive numbers of persistent writes to a particular memory location are detected, at step 310 the apparatus is caused to apply selective throttling to the persistent write activity for that location. In one implementation, at step 312, a signal may be sent to a higher level in the hardware/firmware/software stack to cause a higher-level component to detect, at step 314, the source of the excessive persistent writes at the higher level. In one implementation, an alert may be issued to a user or administrator of the system. In a refinement, a component at the higher level in the hardware/firmware/software stack may be operable to perform actions such as disabling the source of the excessive writes, rate-limiting the source, or taking some other remedial action. One possible example of a remedial action is to cause subsequent persistent write activity to be retargeted to a different memory location, using, for example, virtualization of addressing to maintain the accessibility of the relocated data. The method may loop back to step 304 to continue processing, or may proceed to End step 318.

Implementations of the presently-disclosed technology thus provide apparatus, methods and computer program products operable to ameliorate the effects of excessive write operations to memories caused by persistent write operations issued by the software. The mechanisms described may be implemented in hardware to make them transparent to the software. In an alternative, a firmware or software implementation may be provided, so that the technology may be applied at any level in the hardware/firmware/software stack.

Further, the presently disclosed technology provides the capability to enable flow-control across the entire system, which may be a System on Chip (SoC), for NVM persist operations. This would allow the memory controller (or whichever agent rate-regulates or stops the persist operations) to apply specific back-pressure through the system hardware/firmware/software stack so that other accesses are not blocked in case of excessive NVM persist commands arriving at the memory controller.

As a specific example of these inventions outlined above, if the dynamic memory controller (DMC) is the master controlling the NVM, then the DMC may implement these mechanisms to track the frequency of past persist operations and the addresses or bit-cells these operations target. With this information, if the DMC detects that persist operations are targeting the same set of bit-cells or addresses such that the persistent writes exceed a given threshold, then it will signify this condition to the system control processor (SCP), or similar secure, low-level firmware, which in turn can act appropriately based on configured policies to prevent further such operations from the software. The DMC may also induce back-pressure through the SoC interconnect fabric to ensure that other requests accessing memory keep flowing unimpeded and are not starved due to excessive numbers of persistent write commands.

The most significant technical challenge for these mechanisms to work is in ensuring that there is low-overhead for tracking the persist operations to potentially trillions of memory bit-cells. Tracking each individual bit-cell is simply infeasible. These challenges are addressed by leveraging the abstracted organization of the memory array exposed by the memory vendors, and by carefully choosing the address granularity and the time windows over which to track persist commands. This may be accomplished by providing an array of counters to track persist commands according to a policy, such as tracking the top N locations that are targets of write-persist accesses. The present technology thus tracks the frequency of accesses to memory rows in a fixed time window.

It is further possible to provide a second set of counters to track the M next most targeted locations—those that are most likely to become "hot" in an approaching time window. By tracking accesses over time, it becomes possible also to detect the rates of change of write persist accesses, thus making it possible to detect warning signs, such as a sudden or rapid increase in rate, and thus to provide the ability for the system to react.

Initialization of the process of detecting "hot zones" of persistent write activity against particular memory locations may be accomplished by randomly selecting a number of memory locations and applying counters as described over a time window to detect any significant increases in persistent write accesses. If no such increases are detected, a random selection may be made from the remaining memory locations and the process repeated.

An implementation of a suitable tracking mechanism in the context of persist commands will now be described, by way of example. An N-entry counter is implemented in the memory controller that counts the N-hottest persist commands. This effectively tracks N memory locations in the NVM that are being targeted by the persist commands. N is sized such that the software would be highly unlikely to be capable of performing N+1 persists before the first entry's counter expires. Once the counter reaches its threshold or saturation value, back-pressure may be applied up the hardware/firmware/software stack to throttle back or stop the rate of persist commands, or to cause redirection of the persistent writes to a different location, with appropriate virtualization of addressing to ensure continuity of access. This implementation may sometimes cause a reduction in the service level offered to user applications, but that is a secondary concern if a malicious or erroneous application is managing to perform so many persist commands that it has already significantly impacted system performance.

In refinements of the present technique, "intelligent" components, such as heuristic algorithms or rule-based artificial intelligence systems, may be used to improve the accuracy and efficacy of the technique in use. For example, the persistent write tracker 106 component may be cooperable with an intelligent component to adjust the time window in accordance with feedback from a higher level in the hardware/firmware/software stack. For example, in some cases a rate change in the frequency of persistent writes may require checking at a finer granularity to ensure that action is necessary, in which case a narrowing of the time window may be of assistance. In a further example, threshold exceeded detector component may be cooperable with an intelligent component to adjust the threshold in accordance with feedback from the higher level.

As will be appreciated by one skilled in the art, the present technique may be embodied as a system, method or computer program product. Accordingly, the present technique may take the form of an entirely hardware embodiment, an entirely software embodiment, or an embodiment combining software and hardware.

Furthermore, the present technique may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause the computer system or network to perform all the steps of the method.

In a further alternative, an embodiment of the present technique may be realized in the form of a data carrier having functional data thereon, the functional data comprising functional computer data structures to, when loaded into a computer system or network and operated upon thereby, enable the computer system to perform all the steps of the method.

It will be clear to one skilled in the art that many improvements and modifications can be made to the foregoing exemplary embodiments without departing from the scope of the present technique.

The invention claimed is:

1. A method of operating an apparatus in electronic communication with a memory, and comprising:
   tracking a frequency of persistent writes to at least one memory location during a time window;
   responsive to the tracking, detecting excessive persistent writes to the at least one memory location during the time window by using threshold-exceeded detection;
   responsive to a threshold-exceeded outcome from the threshold-exceeded detection, causing selective throttling of persistent writes to the at least one memory location;
   signalling to a component at least one level higher in a hardware-firmware-software stack to detect a cause of the excessive persistent writes at a source of persistent write commands; and
   adjusting the time window in accordance with feedback from the component at least one level higher in the hardware-firmware-software stack; and
   performing a remedial action on at least one source of persistent write commands, the remedial action including redirecting further persistent writes directed to the at least one memory location to at least one further memory location that is addressed by a virtualization technique of remapping the at least one memory location address.

2. An apparatus, operable to communicate with a memory, comprising:
   a persistent write tracker component operable to track a frequency of persistent writes to at least one memory location during a time window;
   a threshold-exceeded detector component responsive to the persistent write tracker component and operable to detect excessive persistent writes to the at least one memory location during the time window; and
   a selective throttle component operable, in response to a threshold-exceeded outcome from the threshold-exceeded detector component, to cause selective throttling of persistent writes to the at least one memory location, the selective throttle component being further operable to signal to a component at least one level higher in a hardware-firmware-software stack to detect a cause of the excessive persistent writes at a source of persistent write commands,
   where the persistent write tracker component is cooperable with a further component to adjust the time window in accordance with feedback from the component at least one level higher in the hardware-firmware-software stack,
   where the component at least one level higher in the hardware-firmware-software stack is operable to perform a remedial action on at least one source of persistent write commands, the remedial action including to redirect further persistent writes directed to the at least one memory location to at least one further memory location, and
   where the at least one further memory location is addressed by a virtualization technique of remapping the at least one memory location address.

3. The apparatus as claimed in claim 2, wherein the tracker component is operable to track at least one hot zone of persistent write commands.

4. The apparatus as claimed in claim 2, where the component at least one level higher in the hardware-firmware-software stack is further operable to perform at least one of:
   disabling at least one source of persistent write commands, and
   rate-limiting at least one source of persistent write commands.

* * * * *